Patented Sept. 14, 1954

2,689,239

UNITED STATES PATENT OFFICE 2,689,239

PROCESS FOR PREPARING METHYLOL AND ALKOXYMETHYL DERIVATIVES OF POLY-UREIDOPOLYAMIDES AND RESULTING PRODUCTS

Sidney Melamed, Philadelphia, Pa., assignor to Rohm & Haas Company, Philadelphia, Pa., a corporation of Delaware No Drawing. Application November 28, 1952, Serial No. 323,137

17 Claims. (Cl. 260—69)

This invention concerns methylol derivatives of ureidopolyamine-caprolactam condensates. Such derivatives include both hydroxymethyl and alkoxymethyl substituted condensates. This invention also deals with a method for preparing such derivatives.

In my application Serial No. 323,138, filed on even date, there is described the preparation of polyureidopolyamides obtained by reacting together urea and condensates of alkylene polyamines and epsilon-caprolactam. These condensates are prepared by mixing epsilon-caprolactam and one or more alkylene polyamines in a proportion of 3:1 to 1:1 (by moles) and heating the mixture between 150° and 250° C., preferably 180° and 230° C. The reaction mixture is desirably heated under reduced pressure to remove unreacted amine to give a soluble condensate.

This condensate is heated with urea in a proportion supplying a mole of urea for every two —NH— groups up to an excess of urea. The condensate and urea are heated at a temperature between 100° and 200° C., preferably between 110° C. and 160° C., at which ammonia is evolved. There results a polyureidopolyamide, which is the material herein used to form methylol derivatives.

A practical method for following the reaction of urea and condensate comprises collecting ammonia as it is evolved and titrating it. This gives a good approximation of the urea reacted. From this there may be calculated the amount of formaldehyde which should be used in the methylol-forming step.

With reference to the step of forming the polyaminecaprolactam condensates there may be used as suitable polyamines ethylenediamine, propylenediamine, diethylenetriamine, triethylenetetramine, tetraethylenepentamine, pentaethylenehexamine, and similar polyethylenepolyamines, dipropylenetriamine, N,N'-di(aminoethyl)propylenediamine, etc. Mixtures of alkylene polyamines are quite as useful as individual amines. The common alkylene polyamines may be conveniently represented by the formula $NH_2(ANH)_xH$, where A is an alkylene group of two to three carbon atoms and $x$ is an integer, usually not over five. The terms alkylene polyamines or ethylene polyamines are used as general terms to describe these various amines. The ethylene polyamines form a preferred group.

For the conversion of the polyureidopolyamides to methylol derivatives there is used formaldehyde which may be supplied by the aqueous formaldehyde solutions of commerce containing 30% to 50% of formaldehyde, by use of revertible polymers of formaldehyde, or by alcoholic solutions of formaldehyde. The last are particularly useful when the hydroxymethyl groups are to be converted to alkoxymethyl groups.

The hydroxymethyl compounds are usually prepared with the pH of the reaction mixture on the alkaline side, pH's between 7 and 10 being most suitable. The reaction is carried out between 10° and 100° C.

In general the amount of formaldehyde to be added will supply at least one mole of formaldehyde for each ureido unit introduced. More can be reacted, as the amide groups of the ureidopolyamine-caprolactam condensate also react with formaldehyde. Also unreacted urea will take up one to two moles of formaldehyde per mole of urea. An excess of formaldehyde over the calculated amounts may be used, if so desired. Free formaldehyde in the methylol products formed does not interfere with the practical application thereof.

The product first formed by reaction of ureido condensate and formaldehyde is the hydroxymethyl derivative thereof. For many purposes this may be used directly. The hydroxymethyl derivatives find use in paper manufacture for improving wet-strength, in textile finishing for stabilizing cotton, rayon, and wool, and for improving adhesion of rubber to cotton or rayon.

The hydroxymethyl derivatives may, however, be converted to alkoxymethyl derivatives by reacting the hydroxymethyl compound with an alcohol. Particularly useful are alcohols of the structure ROH, where R is an alkyl group of not over eight carbon atoms or best not over four carbon atoms. An alkoxymethyl group from a short chained alcohol can be reacted with a higher boiling alcohol in the presence of an alcoholysis catalyst to effect transetherification. Alkoxymethyl compounds are formed by reacting a hydroxymethyl compound with an alcohol at an acidic pH, the range of five to three being useful. This reaction is usually accomplished between 50° and 110° C. Water may be taken off and the product obtained as a residue or in solution in an excess of the alcohol used. The products obtained in this way are water-soluble if prepared with methyl, ethyl, or even isopropyl alcohol in some cases, and solvent-soluble when larger alcohols are reacted. The alkoxymethyl compounds are generally soluble in polar organic solvents. Films and coatings formed therefrom are useful in being resistant to non-polar solvents. The alkoxymethyl compounds may be mixed with or reacted with alkyd resins for use in coatings.

Typical preparations of methylol derivatives are given in the following illustrative examples. Parts are by weight.

Example 1

(a) There were reacted together 565 parts of epsiloncaprolactam and 515 parts of diethylenetriamine by heating the mixture thereof at 200°–210° C. for 48 hours, while a slow stream of nitrogen was passed therethrough. Free amine was taken off by heating at 220° C./30 mm. The condensate thus formed was that from the polyamine and caprolactam in a 1:2 mole ratio.

A mixture of 576 parts of this condensate and 265 parts of urea was heated at 110°–130° C. for two hours and then up to 160° C. during the next two hours. From absorption of ammonia liberated in the reaction 85% of the urea had reacted to form a polyureidopolyamide.

(b) A solution was made from 224 parts of this polyureidopolyamide in 300 parts of water. This was treated with 209 parts of aqueous 36.9% formaldehyde solution. The mixture was then diluted with water to a total of 900 parts. The pH of this reaction mixture was 8.4. By treatment of a sample of this reaction solution with cold sodium sulfite and titration of alkalinity, it appeared that 26.6% of the added formaldehyde remained unreacted. This would indicate that formaldehyde reacted both with ureido units and with amido units.

The product was a pale yellow solution of hydroxymethyl polyureidopolyamide. This solution was stored for over six months at 30°–35° C. and was found entirely stable.

This condensate was used to improve adhesion of rubber to tire cord, being mixed with rubber latex and applied to cord. The treated cord was heated five to ten minutes at 280°–300° F. Adhesion was markedly increased.

Example 2

A solution of 150 parts of a polyureidopolyamide from caprolactam and diethylenetriamine condensate from a 2:1 mole ratio of these reactants which has reacted with urea in a ratio giving one mole of urea per —NH— group was made in 105 parts of water. Thereto was added 165 parts of aqueous 35.2% formaldehyde solution. The pH of the mixture was adjusted to a value of 9.5 and the mixture was heated on a steam bath. At the start the viscosity of the solution was D on the Gardner-Holdt scale. After 4.5 hours on the steam bath the solution had a viscosity of G. It was treated with a mixture of an acidic sulfonated cation-exchange resin and a basic quaternary ammonium anion-exchange resin. The pH was then found to be 7.0. The solution was concentrated by heating under reduced pressure until a viscosity of T on the Gardner-Holdt scale was reached. This solution was treated with more of the mixture of ion-exchange resins and filtered through an absorbent siliceous filter-aid. There was thus obtained a light yellow solution of resin containing 53% of resin-solids and amounting to 317 parts.

This product was used as a plywood adhesive. Ammonium sulfate, oxalic acid, and ammonium thiocyanate were used as catalysts. The plywood laminates formed had excellent dry shear strength.

Example 3

There was taken a portion of 106 parts of the polyureidopolyamide solutions prepared in Example 1 (a) and thereto were added 130 parts of an aqueous 36.8% formaldehyde solution, 370 parts of n-butanol, and 74 parts of xylene. This mixture was charged to a reaction vessel equipped with thermometer, stirrer, and water-separator. The charge was adjusted to a pH of 10 and heated to about 80° C. for 30 minutes. The pH was adjusted to a value of 7 by addition of phosphoric acid. The charge was heated with evolution of an azeotropic mixture from which water was separated. The pot temperature rose to 100° C. When water was no longer given off, the pH of the reaction mixture was adjusted to a value of 5 by addition of phosphoric acid. Heating was continued and water of reaction was taken off with the pot temperature rising to 110° C. The mixture was neutralized with sodium hydroxide solution and concentrated under reduced pressure to give a light-colored resin. This resin was soluble in all proportions in ethanol and butanol. It was useful in coating compositions, particularly in conjunction with alkyd resins.

Example 4

By the steps described above there was prepared a polyureidopolyamide from epsiloncaprolactam, diethylenetriamine, and urea in a 2:1:3 mole ratio. A portion of 96.4 parts of this condensate was added to a solution of 64 parts of paraformaldehyde of 91% purity in 160 parts of methanol. The mixture was adjusted to a pH of 9 and heated at 60°–70° C. for 20 minutes. The pH of the reaction mixture was adjusted with phosphoric acid to a value of 5. The mixture was heated for 10 minutes at 70° C. The pH was lowered to a value of 3.5 with more of this acid. The mixture was again heated for 10 minutes and then neutralized with caustic soda solution. The neutral mixture was concentrated by heating under reduced pressure and filtered to give a clear solution containing 57% of resin solids. The solution had a viscosity of H on the Gardner-Holdt scale and a color of 2–3. The resin thus obtained was a methoxymethyl derivative of the polyureidopolyamide condensate.

The above procedure was repeated with substitution of formic acid for the phosphoric acid. Neutralization was accomplished with a solution of potassium hydroxide in methanol. The product was practically identical with that prepared above having the same solids-viscosity relationship.

This resin was used as a textile finish, aqueous solutions thereof being applied in conjunction with a curing catalyst to wool, rayon, and nylon. Desirable finishes were imparted to all of these fibers. To nylon it imparted a crisp finish which is desired in laces, scrims, marquisettes, and the like. Applied to a rayon fabric it imparted considerable stability against shrinkage and improved crease recovery without causing noticeable loss in abrasion resistance and in some cases it actually improved abrasion resistance.

The product of Example 1 was applied to tire cord. The thus treated cord was coated with a "cold rubber" and cured. An adhesion of 8.6 pounds was measured on ¼ inch H-shaped rubber strips at a temperature of 250° F.

The product of Example 2 was used for an adhesive for plywood. Ammonium sulfate and oxalic acid were used as catalysts. With an assembly time of five minutes dry shear tests gave 100% wood failure.

The product of Example 3 was used as a coating. The coating had a hardness of 8H (Kohinoor pencil scale) and had good film length with better adhesion than urea formaldehyde coatings. The material was formulated with alkyd resin in a 30:70 ratio and the resulting composition was pigmented with 50% titanium dioxide. This gave glossy, hard coatings having good adhesion, good color, and excellent resistance at 77° F. to both water and toluene.

I claim:

1. A process for preparing methylol derivatives of polyureidopolyamides which comprises reacting an alkylene polyamine and epsilon-caprolactam together at a temperature between 150° and 250° C. in a ratio of one mole of said polyamine to one to three moles of said caprolactam, whereby a soluble reaction product is obtained, combining said reaction product with urea at a temperature between 110° and 160° C. until at least 70% of the theoretical ammonia is evolved, whereby a polyureidopolyamide condensate is formed, and reacting said condensate with formaldehyde.

2. A process for preparing methylol derivatives of polyureidopolyamides which comprises reacting an ethylene polyamine and epsilon-caprolactam together at a temperature between 150° and 250° C. in a ratio of one mole of said polyamine for one to three moles of said caprolactam, whereby a soluble reaction product is obtained, reacting a mixture of said product and urea between 110° and 160° C., the urea being present in a proportion of at least one mole for each basic nitrogen in the said reaction product in said mixture, whereby a polyureidopolyamide condensate is formed, and reacting said condensate with at least one mole of formaldehyde for each ureido unit therein.

3. A process for preparing methylol derivatives of polyureidopolyamides which comprises reacting together formaldehyde and the product obtained by reacting urea with a condensate from epsilon-caprolactam and an alkylene polyamine having alkylene groups of two to three carbon atoms in a mole ratio of caprolactam to polyamine from 1:1 to 3:1.

4. A process for preparing alkoxymethyl derivatives of polyureidopolyamides which comprises reacting together at a temperature between 10° and 100° C. at a pH between 7 and 10 formaldehyde and the product obtained by reacting urea with a condensate from epsilon-caprolactam and an ethylene polyamine in a mole ratio of caprolactam to polyamine from 1:1 to 3:1, whereby a hydroxymethylated product is formed, and reacting said product at a pH between 5 and 3 at a temperature between 50° and 110° C. with an alcohol ROH, where R is an alkyl group of not over eight carbon atoms.

5. The process of claim 4 in which the alcohol is methanol.

6. The process of claim 5 in which the alcohol is butanol.

7. A process for preparing methylol derivatives of polyureidopolyamides which comprises reacting together at a temperature between 10° and 100° C. at a pH between 7 and 10 formaldehyde and the product obtained by reacting urea with a product obtained by reacting by condensing together epsilon-caprolactam and diethylenetriamine in a mole ratio of caprolactam to polyamine from 1:1 to 3:1.

8. A process for preparing alkoxymethyl derivatives of polyureidopolyamides which comprises reacting together at a temperature between 10° and 100° C. at a pH between 7 and 10 formaldehyde and the product obtained by reacting urea with a product obtained by reacting by condensing together epsilon-caprolactam and diethylenetriamine in a mole ratio of caprolactam to polyamine from 1:1 to 3:1, whereby a hydroxymethylated product is formed, and reacting said product at a pH between 5 and 3 at a temperature between 50° and 110° C. with a saturated monohydric alcohol of not over four carbon atoms.

9. The process of claim 6 wherein the alcohol is methanol.

10. The product of the process of claim 9.

11. The process of claim 8 wherein the alcohol is n-butanol.

12. The product of the process of claim 11.
13. The product of the process of claim 1.
14. The product of the process of claim 2.
15. The product of the process of claim 4.
16. The product of the process of claim 7.
17. The product of the process of claim 8.

References Cited in the file of this patent

FOREIGN PATENTS

| Number | Country | Date |
| --- | --- | --- |
| 457,909 | Italy | June 17, 1950 |
| 457,911 | Italy | June 17, 1950 |